Inventor
Paul VOSSIECK

By Toulmin & Toulmin
Attys.

United States Patent Office 3,358,988
Patented Dec. 19, 1967

3,358,988
TENSIONING SPRING FOR PISTON RINGS
Paul Vossieck, Burscheid, Cologne, Germany, assignor to Goetzewerke Friedrich Goetze A.G., Dusseldorf, Germany
Filed Jan. 5, 1965, Ser. No. 423,515
Claims priority, application Germany, Apr. 2, 1964, G 40,252
1 Claim. (Cl. 267—1.5)

This invention relates to a tensioning spring for tensioning oil stripping rings mounted on pistons of internal combustion engines. In internal combustion engines it is known to use piston rings for regulating the oil supply along the pistons and for stripping oil from the walls of the cylinders in which the pistons reciprocate. Oil stripping rings of the nature referred to usually consist of two annular steel bands relatively thin in the axial direction. These bands are pressed radially outwardly of the piston into engagement with the cylinder wall and thus strip oil from the cylinder during the downward movement of the piston therein. Spring means are provided for urging the steel bands radially outwardly of the piston and usually take the form of a spring element force meandering or wave-like in plane so that substantially uniform tension is applied to the rings completely around the periphery thereof and whereby irregularities of the cylinder wall are compensated for automatically.

Such spring rings are known, the convolutions of which at the bottoms of the piston grooves carry lugs for engagement with the inner peripheral portion of the annular oil stripping rings. These lugs are usually inclined somewhat relative to the axis of the piston so that the annular rings are supported thereby and are urged thereby against the flanks of the groove in which the rings are mounted.

The present invention is concerned with a tensioning spring of the nature referred to which at one time adequately supports and locates the annular oil stripping rings while maintaining the rings in engagement with the cylinder wall, while at the same time, substantially improving the radial mobility of the rings whereby an improved functioning of the rings is obtained.

The present invention also has as an object the structure of a tensioning spring of the nature referred to which is easy to assemble in the groove of a piston together with the annular oil stripping bands and which will remain in satisfactory operation for a long period of time.

In general, the objectives of the present invention are realized by providing a meandering or waved form spring ring with lugs on the inner convolutions which are bent downwardly toward the central plane of the ring to an acute angle relative to the ring. By so shaping the lugs in this manner the distance between the lugs and the flanks of the groove in which they are mounted and also from the cylinder wall can be dimensioned to the point that annular oil stripping rings can be employed which are quite thin in the axial direction and which are also relatively narrow in the radial direction and which can therefore readily adapt themselves to irregularities in the cylinder walls.

These and other objects and advantages of this invention will become more apparent upon reference to the following specification taken in connection with the accompanying drawings, in which.

Figure 1:
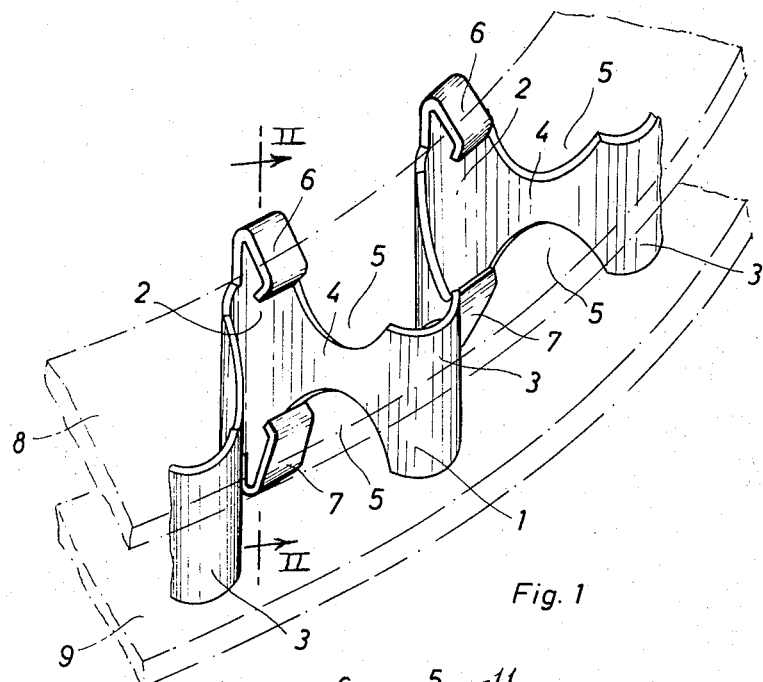
FIGURE 1 shows in perspective a portion of a spring ring according to the present invention.

Referring to the drawings somewhat more in detail, numeral 1 indicates the spring ring according to the present invention in which, when viewed in plan, is an annular member of meandering or wave form having inner convolutions 2 and outer convolutions 3. The inner and outer convolutions are connected by shank portions 4 which are notched top and bottom as indicated by reference numeral 5 to provide passageways for oil.

Figure 2:
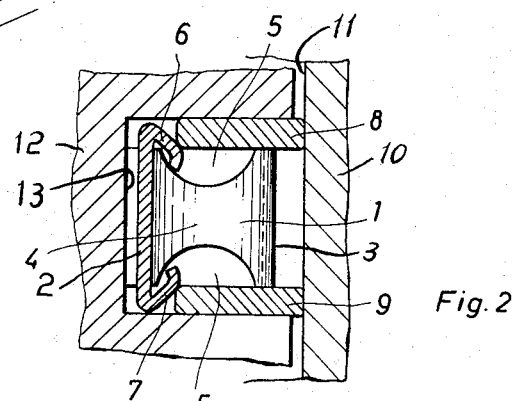
FIGURE 2 is a sectional view through the spring ring indicated by line II—II on FIGURE 1, but showing also the piston groove in which the ring is mounted, the oil stripping rings and the cylinder wall engaged by the ring.

The upper and lower ends of the inner convolutions 2 are provided with extensions 6 and 7 which are bent toward the outside of the ring and then downwardly toward the central plane of the ring to provide resilient lug elements as will be seen in FIGURES 1 and 2. These lug elements are bent downwardly an amount greater than 90° but less than 180.° An angle of from 120° to 160° of bending produces suitable lugs which do not tend to bind on the inner corners of the oil stripping rings. These last-mentioned rings are designated 8 and 9 in FIGURE 2 and it will be seen that they are supported in in spaced relation by the convolutions 3 while being engaged at their inner sides by the resilient lugs 6 and 7. The rings 8 and 9 are movable freely in the radial direction and are dimensioned small enough in both the axial and radial direction as to possess sufficient resiliency to enable them substantially to follow normal types of irregularities encountered in the cylinder wall which they engage.

In FIGURE 2 the cylinder is indicated at 10 and the wall engaged by the rings indicated at 11. The piston supporting the spring ring and the oil stripping rings is indicated 12 and the piston groove in which the wave rings are mounted is designated 13.

Figure 3:
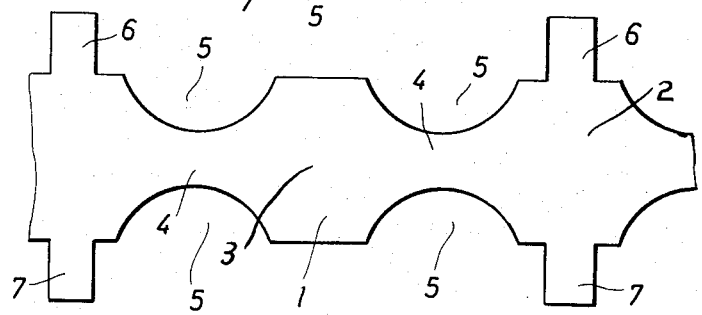
FIGURE 3 is a fragmentary view showing a portion of the blank from which the spring ring is formed.

It will be understood, of course, that in making the ring, it would first be blanked out in strip form as is shown in FIGURE 3 and thereafter be formed in suitable dies to the form shown in FIGURES 1 and 2 and would then be heat treated to impart the desired degree of permanent resilience to the ring.

It will be understood that this invention is susceptible to modification in order to adapt it to different usages and conditions; and accordingly, it is desired to comprehend such modifications within this invention as may fall within the scope of the appended claim.

What is claimed is:

A spring ring for mounting in the groove of a piston for supporting radially narrow and axially thin oil stripping rings in said groove at the top and the bottom thereof, while resiliently urging the oil stripping rings into engagement with the wall of a cylinder in which the piston is mounted comprising: a resilient band formed substantially into a circle and having radially inner and outer convolutions therein extending in the radial direction, and axial lugs on the top and bottom of the peak portions of said radially inner convolutions, each said lug having a bend therein near the juncture of the lug and spring ring, and the portion of each lug disposed on the opposite side of the bend therein from the spring ring having a straight surface and extending radially outwardly and axially inwardly at an angle toward the lateral central plane of the spring ring so that said portions of the lugs on the opposite ends of each inner convolution of the spring ring converge in the radially outward direction of the spring ring, the bends in the lugs on each side of the ring being disposed in respective common planes which are parallel and axially spaced a distance about equal to the axial extent of said groove, the said angle at which each said portion of each lug extends toward the lateral central plane of the spring ring being the same for all of the said portions, said portions of the lugs on the opposite ends of each radially inner convolution including an angle of from about 20° to about 60° between said straight surface and said inner convolution, said radially outer convolutions of the spring ring having an axial length of about equal to the axial length of said groove minus the combined axial thickness of the two oil stripping rings; and portions of the spring ring connecting adjacent convolutions being notched out on at least one of the top and bottom sides to provide oil passage means whereby axially thin oil stripping rings disposed in opposite ends of the groove will be engaged by said straight surface of said lugs at a plurality of points about the inner peripheries thereof at the side of each oil stripping ring which faces the other oil stripping ring.

References Cited

UNITED STATES PATENTS

| | | | |
|---|---|---|---|
| 2,768,038 | 10/1956 | Cable | 277—140 |
| 3,004,811 | 10/1961 | Mayfield | 277—141 X |
| 3,140,096 | 7/1964 | Rodenkirchen | 277—141 |

SAMUEL ROTHBERG, *Primary Examiner.*

J. S. MEDNICK, *Assistant Examiner.*